(12) United States Patent  (10) Patent No.: US 8,985,092 B2
Ahmed  (45) Date of Patent: Mar. 24, 2015

(54) COOKING GRILL AND BURNER HAVING V-SHAPED FIREBOX

(75) Inventor: Mallik Ahmed, Columbus, GA (US)

(73) Assignee: W.C. Bradley Co., Columbus, GA (US)

( * ) Notice: Subject to any disclaimer, the term of this patent is extended or adjusted under 35 U.S.C. 154(b) by 695 days.

(21) Appl. No.: 13/253,221

(22) Filed: Oct. 5, 2011

(65) Prior Publication Data

US 2013/0087136 A1  Apr. 11, 2013

(51) Int. Cl.
*A47J 37/07* (2006.01)

(52) U.S. Cl.
CPC .................................. *A47J 37/0713* (2013.01)
USPC .......................... 126/39 E; 126/25 R; 99/450

(58) Field of Classification Search
CPC ....... A47J 37/0704; A47J 37/07; F24C 3/085; F24C 3/04
USPC .................. 126/39 E, 25 R; 99/450
See application file for complete search history.

(56) References Cited

U.S. PATENT DOCUMENTS

| | | | |
|---|---|---|---|
| 3,178,161 A * | 4/1965 | Yeo et al. | 432/222 |
| 3,805,688 A | 4/1974 | Gvozdjak | |
| 4,434,781 A * | 3/1984 | Koziol | 126/25 R |
| 4,715,356 A | 12/1987 | Reynolds | |
| 4,927,356 A | 5/1990 | Otsuka et al. | |
| 2009/0202688 A1 | 8/2009 | Best | |
| 2009/0308374 A1 | 12/2009 | Ahmed | |
| 2011/0219957 A1* | 9/2011 | Fogolin | 99/450 |

FOREIGN PATENT DOCUMENTS

WO   WO 2010028665 A1 *  3/2010 ............. A47J 37/07

OTHER PUBLICATIONS

PCT/US2012/058728 International Serch Report and Written Opinion, "Cooking Grill and Burner Having V-Shaped Firebox," Feb. 10, 2014; Published in PCT.

* cited by examiner

*Primary Examiner* — Avinash Savani
(74) *Attorney, Agent, or Firm* — Dennis D. Brown; Brown Patent Law, P.L.L.C.

(57) ABSTRACT

A grill and a burner assembly therefor. The burner assembly utilizes a V-shaped firebox having a V-shaped combustion chamber containment wall, which defines a combustion chamber of significantly reduced volume. The burner assembly can also have a V-shaped outer insulating wall which is positioned outside of the combustion chamber containment wall such that an insulating gap is formed between the inner V-shaped wall and the outer V-shaped wall. A burner element preferably extends longitudinally within the combustion chamber of the firebox above the bottom of the V-shaped combustion chamber containment wall.

25 Claims, 5 Drawing Sheets

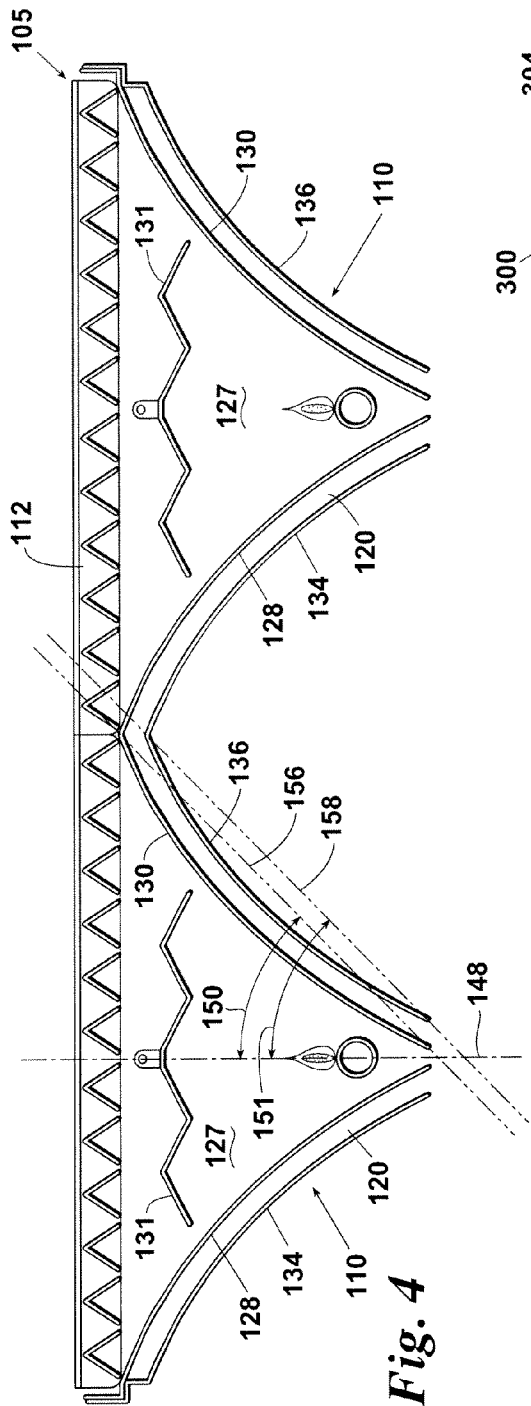
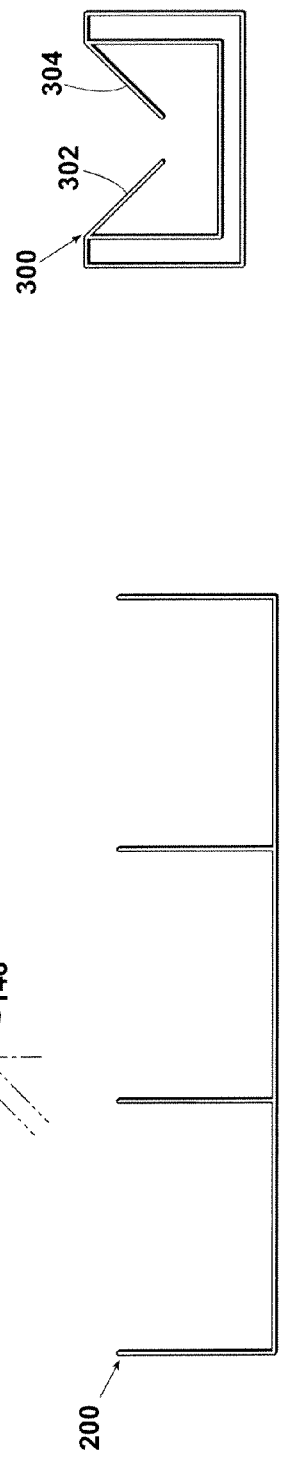
Fig. 4
Fig. 5 (PRIOR ART)
Fig. 6 (PRIOR ART)
Fig. 7 (PRIOR ART)

COOKING GRILL AND BURNER HAVING V-SHAPED FIREBOX

FIELD OF THE INVENTION

The present invention relates to outdoor cooking grills, other cooking grills, and to burner assemblies therefor.

BACKGROUND OF THE INVENTION

Outdoor grilling systems which utilize infrared radiant energy for cooking are known in the art. The beneficial results which these systems are capable of providing over conventional convective grills are also well known. However, a continuing need exists for better and/or lower cost alternative infrared grills and burner systems which provide greater thermal efficiencies and other improvements.

By way of example, but not by way of limitation, a need exists for better and/or lower cost alternative infrared grills and burner assemblies which:
  require less metal for fabrication;
  are less complex and are easier and less costly to fabricate and produce;
  provide better segregation of cooking zones such that the carryover of heat from one cooking zone to other cooking zones which are not in operation, or are operating at a lower settings, is significantly reduced;
  are not limited solely to use with an infrared cooking grate for infrared cooking but also provide the option of alternatively using a convective grate for convective cooking.

A preferred prior art box burner assembly for use in an infrared grill is disclosed in United States Patent Application Publication No. US 2009/0202688 A1. FIG. 16 of the published application is across-sectional view of the simplest version of the prior art box burner which comprises: a single-walled rectangular firebox; a large diameter burner tube which extends longitudinally through the rectangular firebox and has two rows of flame ports such that flames are ejected in substantially horizontal directions from both sides of the tube burner; and two rows of secondary air openings provided through the bottom of the rectangular box. The two rows of secondary air openings run parallel with the tube burner on each side thereof and are spaced laterally outward from the tube burner a significant distance for feeding the two rows of horizontally flames ejected in opposite directions from the burner tube.

An alternative version of the prior art box burner is depicted in FIG. 4 of the Publication No. US 2009/0202688 A1 wherein; sloped baffles which extend inwardly as far as the two rows of secondary air openings are positioned inside of the rectangular burner box; a layer of insulation is added to the interior wall of the rectangular box beneath the baffles; and the effective width of the burner element is further increased significantly by adding a baffle housing arrangement outside of the large burner tube. As explained in the publication, combustion gasses from the burner also flow into the spaces formed beneath the internal baffles so that the entire volume of the rectangular box must be filled with and heated by the combustion gasses produced by the burner element. The sloped baffles operate to more effectively direct the infrared radiant energy emitted from the interior surfaces of the burner box toward the cooking grate.

A third embodiment of the prior art box burner is shown in FIG. 17 of Publication No. US 2009/0202688 A1. The version of FIG. 17 employs a single-walled firebox which is similar to the single-walled rectangular box of FIG. 16 except that the single-walled box of FIG. 17 has a trapezoidal cross-sectional shape comprising: a wide horizontal bottom plate which includes and extends beyond the rows of secondary air openings on each side of the burner element; a top opening which is wider than the bottom plate; and sloped sides which extend upwardly from the outer edges of the bottom plate to the top of the burner box. The single-walled trapezoidal burner utilizes a wide burner element of the type shown in FIG. 4 comprising a large baffle housing assembly which surrounds the large diameter burner tube.

Based solely upon the illustration of the trapezoidal firebox in FIG. 17, it appears that the total combustion gas receiving volume of the single-walled trapezoidal burner box shown would be about 75% of the volume of a hypothetical rectangular firebox of equal depth and of equal discharge area width and length (i.e., a hypothetical rectangular firebox traced over the illustration of the trapezoidal firebox in FIG. 17).

However, it is important to note that the tracing of a hypothetical rectangular firebox over FIG. 17 is not relevant to any attempt to compare the intended or necessary volume of the trapezoidal box of FIG. 17 to the intended or necessary volumes of the rectangular boxes of FIGS. 4 and 16. Publication No. US 2009/0202688 A1 does not show or discuss any such hypothetical rectangular box and does not teach that the depth and discharge dimensions of the trapezoidal box are, or even could be, the same as those of the single-walled rectangular box shown in FIG. 16 or the baffled rectangular box shown in FIG. 4. Nor does the publication state or suggest, in any other way, that the construction and dimensions of the trapezoidal burner can or should be such that the volume of the trapezoidal firebox would be somewhat less than that of the rectangular burner of FIG. 16 or the rectangular burner of FIG. 4.

Consequently, Publication No. U.S. 2009/0202688 A1 neither discusses nor suggests that any relevant differences actually exist between the actual volumes or operating characteristics of the fireboxes of FIGS. 4, 16, and 17. Rather, by requiring that combustion gases must also fill the volume beneath the sloped internal baffles of FIG. 4, the publication indicates that the total effective volumes and related operating characteristics of all of the rectangular and sloped burners shown in these figures are equalized. Those in the art would readily understand that the depth and the width of the trapezoidal firebox of FIG. 17 can be set as necessary to provide essentially the same volume and operating characteristics as a rectangular box of the type shown in FIG. 4 or 16.

Although the box burner assemblies of US 2009/0202688 A1 are superior to other prior art burners for infrared grilling, the large interior volumes which they require, along with other requirements and characteristics of these burners, present difficult barriers for achieving further improvements in performance and efficiency. Moreover, even if the actual volume of the trapezoidal box of FIG. 17 of the publication were assumed to be somewhat smaller, the performance of the single-walled trapezoidal burner box would still be roughly the same as the performance of the single-walled rectangular firebox shown in FIG. 16. Although a somewhat smaller volume of the trapezoidal firebox might tend toward some increase in the temperature of the combustion gas exiting the top of the trapezoidal firebox, any tendency to provide a higher firebox temperature would be significantly diminished by the large excess volume of cold secondary air which enters the bottom of the firebox through the two rows of air openings. Two rows of air openings providing a sizable total air intake must be provided in the bottoms of the trapezoidal and rectangular boxes of FIGS. 16 and 17 in order to support the two long flame rows extending down the opposite sides of the elongate burner element.

Moreover, any significant reduction in the actual constructed volume of the trapezoidal burner assembly shown in FIG. 17 of Publication No. US 2009/0202688 A1 would also result in other operational and certification problems. According to Boyle's law, at given fuel rate, a significant reduction in volume would produce a corresponding increase in firebox pressure. Although such a significant increase in pressure would then in turn theoretically result in an increased operating temperature in the firebox (Gay-Lussac's law), the increased pressure would also prevent a sufficient amount of secondary air flow into the firebox to complete the combustion process. Therefore, the fuel rate to the firebox would have to be reduced significantly in order to meet industry certification requirements related to carbon monoxide emissions.

Unfortunately, however, such a reduction in the fuel rate for the trapezoidal burner of FIG. 17 would also lead to further problems. Given the fuel supply pressure and rate necessary to support the two long flame rows extending along opposite sides of the elongate burner element used in the assembly, a reduction in the fuel gas supply rate and pressure sufficient to address the CO emission problems caused by the reduced air intake would, in turn, render the burner element susceptible to failing industry wind certification tests which require that the burner must remain lit, with the grill cover open, when exposed to a wind speed of 10 miles per hour (per ANSI standard, 2.23 of ANSI Z21.58-2007).

SUMMARY OF THE INVENTION

The present invention provides a grill apparatus and a burner assembly therefor which provide significant benefits and improvements in the art. The present invention utilizes a V-shaped burner firebox which preferably has a firebox volume in the range from about 60% to about 25%, more preferably from about 55% to about 35%, of that of a rectangular box burner having (a) the same depth and (b) an upper discharge opening of the same width and area as the inventive V-shaped firebox. In addition, the inventive V-shaped burner can provide an even further reduction in firebox volume by permitting the depth of the firebox to be reduced.

Regardless of whether the inventive V-shaped burner assembly is used with an infrared cooking grate or a convective cooking grate, the inventive assembly provides beneficial increases in the temperature and pressure within the burner firebox at any given fuel rate, which in turn operate to (a) improve all types of heat transfer occurring within the grill to the cooking grate and to the food and (b) allow the amount and rate of fuel usage to be significantly reduced. These changes significantly improve the fuel efficiency of the inventive burner and grill and also operate to increase the proportion of infrared energy transmitted to the food. Fuel efficiency is further improved as a result of: (a) the reduced surface area of the firebox, which in turn results in less convective and radiant heat loss to the atmosphere, and (b) a reduced intake of excess cold secondary air into the firebox. Further, the sides of the inventive V-shaped firebox are closer to cooking grate and are oriented in a manner to provide a higher amount of infrared radiant heat transfer from the firebox to the cooking grate.

Moreover the inventive grill and V-shaped burner provide all of these benefits while also providing significantly improved fuel input optimization and improved flame performance and management so that the fuel rate to the firebox can be readily adjusted as necessary in order to: (a) achieve generally any desired combustion gas temperature and cooking temperatures, (b) maintain a sufficient air to fuel ratio in the firebox to provide substantially complete combustion of the fuel and prevent carbon monoxide emissions, and (c) prevent flame failure with the grill open at high at wind conditions, even at very low fuel input rates.

In addition to the methods and advantages listed above, the inventive grill and V-box burner assembly also: (i) require less metal for fabrication; (ii) are less complex in design and are therefore easier and less costly to fabricate; (iii) allow the use of a much simpler and less expensive tube burner element (e.g., a length of NPS ½ inch diameter pipe); (iv) provide significantly improved flame discharge and air intake patterns and orientations which increase the life of the burner element; (v) provide accelerated grease drainage on the slanted surfaces of the V-shaped firebox, thereby reducing flareups; (vi) provide significantly improved segregation and zonal performance when a side-by-side series of two or more of the inventive V-shaped burner assemblies are installed in a parallel, adjacent relationship in a grill housing; and (vii) provide a more even distribution of heat to the cooking grate and in the cooking zone above the grate.

In one aspect, there is provided a burner assembly for a grill preferably comprising a firebox having a longitudinally extending combustion chamber containment wall which defines a combustion chamber therein. The combustion chamber containment wall has a substantially V-shaped cross-section and an upper discharge opening. The combustion chamber containment wall further comprises: a longitudinally extending bottom, a longitudinally extending left side, and a longitudinally extending right side. As viewed in the substantially V-shaped cross-section of the combustion chamber containment wall, the left and the right sides of the combustion chamber containment wall extend upwardly from the bottom to the upper discharge opening of the containment wall. In addition, the left and the right sides of the combustion chamber containment wall diverge outwardly from, or proximately from, the bottom of the combustion chamber containment wall to, or proximately to, the upper discharge opening. Further, the left and the right sides of the combustion chamber containment wall have lower ends, at the bottom of the combustion chamber containment wall, which are in close proximity to each other, or are located substantially at a shared point.

This burner assembly also preferably comprises a burner element extending longitudinally in the combustion chamber above the longitudinally extending bottom of the combustion chamber containment wall. The burner element has one or more discharge openings for delivering a fuel, or a fuel and air mixture, into the combustion chamber.

In another aspect, the firebox of the burner assembly preferably further comprises a longitudinally extending insulating wall positioned outside of the combustion chamber containment wall. The insulating wall has a substantially V-shaped cross-section and the insulating wall further comprises: a longitudinally extending bottom, a longitudinally extending left side, and a longitudinally extending right side. As viewed in the substantially V-shaped cross-section of the insulating wall, the bottom of the insulating wall is positioned below the bottom of the combustion chamber containment wall and the left and right sides of the insulating wall extend upwardly from, and diverge outwardly from or proximately from, the bottom of the insulating wall such that: (i) the left side of the insulating wall is positioned outside of and adjacent to the left side of the combustion chamber containment wall such that a left side insulating gap is formed between the left sides, and (ii) the right side of the insulating wall is positioned outside of and adjacent to the right side of the combustion chamber containment wall such that a right side insulating gap is formed between the right sides. Further, the left and right sides of the insulating wall have lower ends at the bottom of the insulating wall which are in close proximity to each other or are located substantially at a shared point.

In another aspect, there is provided a burner assembly for a grill preferably comprising: (a) a double-walled firebox having a V-shaped cross-section and (b) a burner element. The double-walled firebox preferably comprises a longitudinally extending inner combustion chamber containment wall having: a V-shaped cross-section, a longitudinally extending bottom, a longitudinally extending left side, and a longitudinally extending right side. A combustion chamber is defined in the inner wall between the left and the right sides of the inner wall. In the V-shaped cross-section of the inner wall, the left and right sides of the inner wall extend upwardly from, and diverge outwardly from or proximately from, the bottom of the inner wall.

The double-walled firebox also preferably comprises a longitudinally extending outer insulating wall positioned outside of and adjacent to the inner wall. The outer wall has: a V-shaped cross-section, a longitudinally extending bottom, a longitudinally extending left side, and a longitudinally extending right side. In the V-shaped cross-section of the outer wall, the left and the right sides of the outer wall extend upwardly from, and diverge outwardly from, or proximately from, the bottom of the outer wall.

In this burner assembly, the bottom of the outer wall will preferably be positioned below the bottom of the inner wall. In addition, the left side of the outer wall will preferably be positioned outside of the left side of the inner wall such that a left side insulating gap is formed between the left side of the inner wall and the left side of the outer wall. Further, the right side of the outer wall will preferably be positioned outside of the right side of the inner wall such that a right side insulating gap is formed between the right side of the inner wall and the right side of the outer wall. These insulating gaps will preferably be air insulation gaps but can alternatively be filled or partially filled with any desired type of insulating material. The insulating gaps will also preferably be formed so that combustion gases produced in the combustion chamber are prevented from entering the insulating gaps.

The burner element used in the burner assembly will preferably extend longitudinally in the combustion chamber above the bottom of the inner wall. In addition, the burner element will preferably have one or more openings for delivering a fuel or a fuel and air mixture into the combustion chamber. The burner element will most preferably comprise a pipe or other conduit having one or more openings formed through the longitudinally extending top thereof for delivering the fuel or fuel and air mixture into the combustion chamber.

In the V-shaped cross-section of the inner combustion chamber containment wall of the firebox, the left and the right sides of the inner wall have lower ends at the bottom of the inner wall which are in close proximity to each other or are located at or substantially at a shared point (preferably a vertex). Similarly, in the V-shaped cross-section of the outer wall of the firebox, the left and the right sides of the outer insulating wall have lower ends at the bottom of the outer wall which are in close proximity to each other or are located at or substantially at a shared point (preferably a vertex).

As used herein and in the claims in reference to the lower ends of the left and right sides of the combustion chamber containment wall and insulating wall, the term "close proximity" means that the lower ends of the left and the right sides are not located more than ½ inch apart. For each of the inner and outer walls, the lower ends of the left and right sides of the wall will preferably not be located more than ⅜ inch apart, more preferably not more than ¼ inch apart, and will most preferably be located at or substantially at a shared point (preferably a vertex).

As also used herein and in the claims in reference to the lower ends of the left and right sides of the combustion chamber containment wall and the insulating wall, the term "proximately from the bottom" means from a location which is not more than ½ inch, more preferably not more than ¼ inch and most preferably not more than ⅛ inch, from the bottom. Similarly, as used herein and in the claims in reference to the left and the right sides of the combustion chamber containment wall, the term "proximately to the upper discharge opening" means to a location which is not more than ½ inch, more preferably not more than ¼ inch and most preferably not more than ⅛ inch, below the upper discharge opening.

In another aspect, there is provided a grill which preferably comprises a housing having therein one inventive burner assembly, or two, three, or more inventive burner assemblies, of any type described herein. The grill preferably comprises a plurality of such burner assemblies positioned adjacent to each other in the housing in a parallel arrangement.

When the grill comprises a plurality of burner assemblies, a corrugated single walled firebox can preferably be made, for example, either by forming from a deep drawn sheet metal or by lap welding multiple sheet metal pieces.

Further aspects, features, and advantageous of the present invention will be apparent to those of ordinary skill in the art upon examining the accompanying drawings and upon reading the following detailed description of the preferred embodiments.

BRIEF DESCRIPTION OF THE DRAWINGS

FIG. 4 schematically illustrates an alternative inventive grill 105 using two inventive double-walled, V-shaped burner assemblies 110 having curved sides which provide a birdwing appearance.

FIG. 5 illustrates a prior art partitioned rectangular burner firebox 200.

FIG. 6 illustrates a prior art non-partitioned rectangular burner firebox 250.

FIG. 7 illustrates a prior art double-walled, rectangular burner firebox 300 with angled deflectors 302 and 304.

DETAILED DESCRIPTION OF THE PREFERRED EMBODIMENTS

Figure 1:
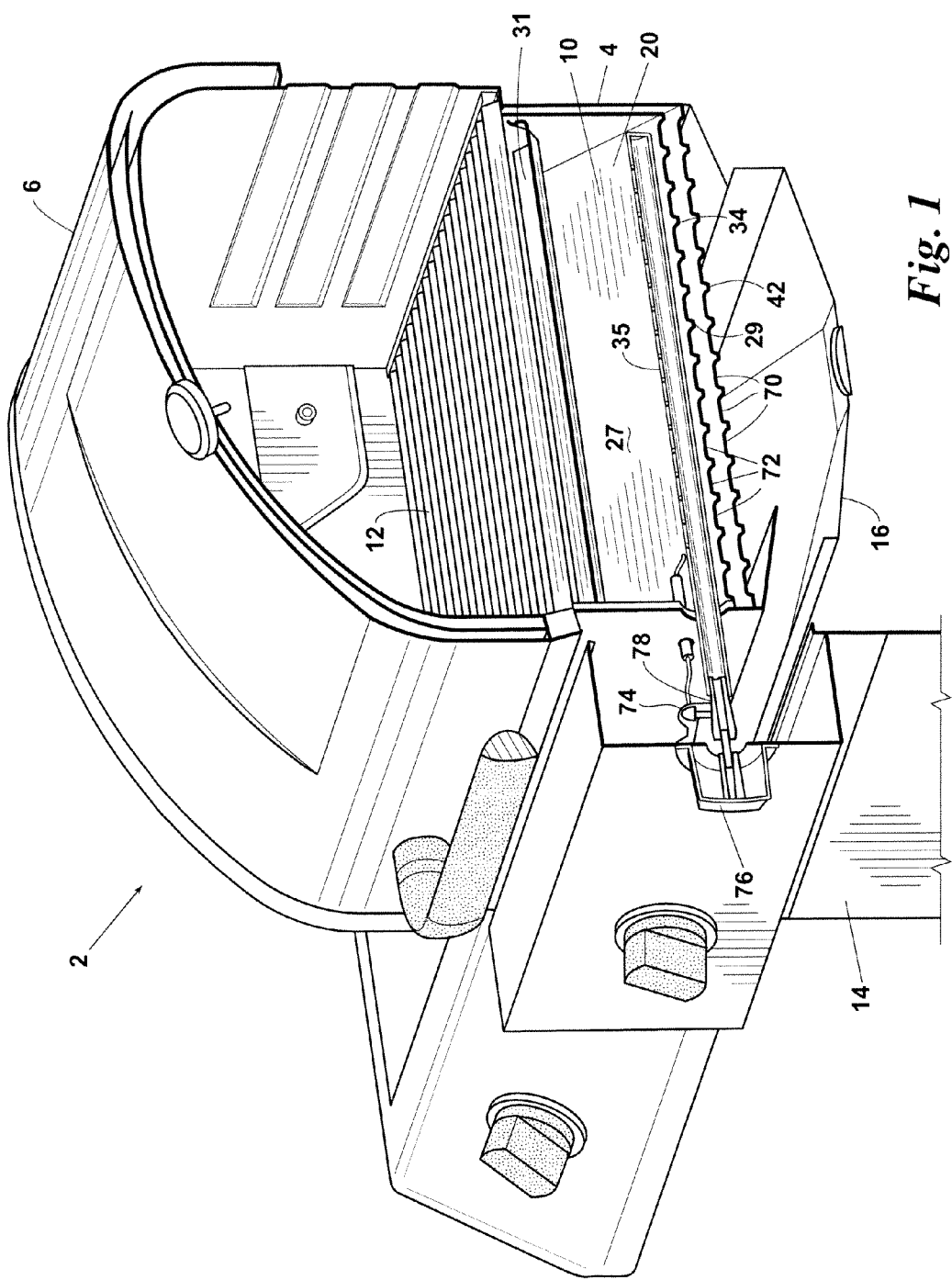
FIG. 1 is a cutaway side perspective view of an embodiment 2 of the grill provided by the present invention using three inventive double-walled, V-shaped burner assemblies 10 and an infrared cooking grate 12.
Figure 2:
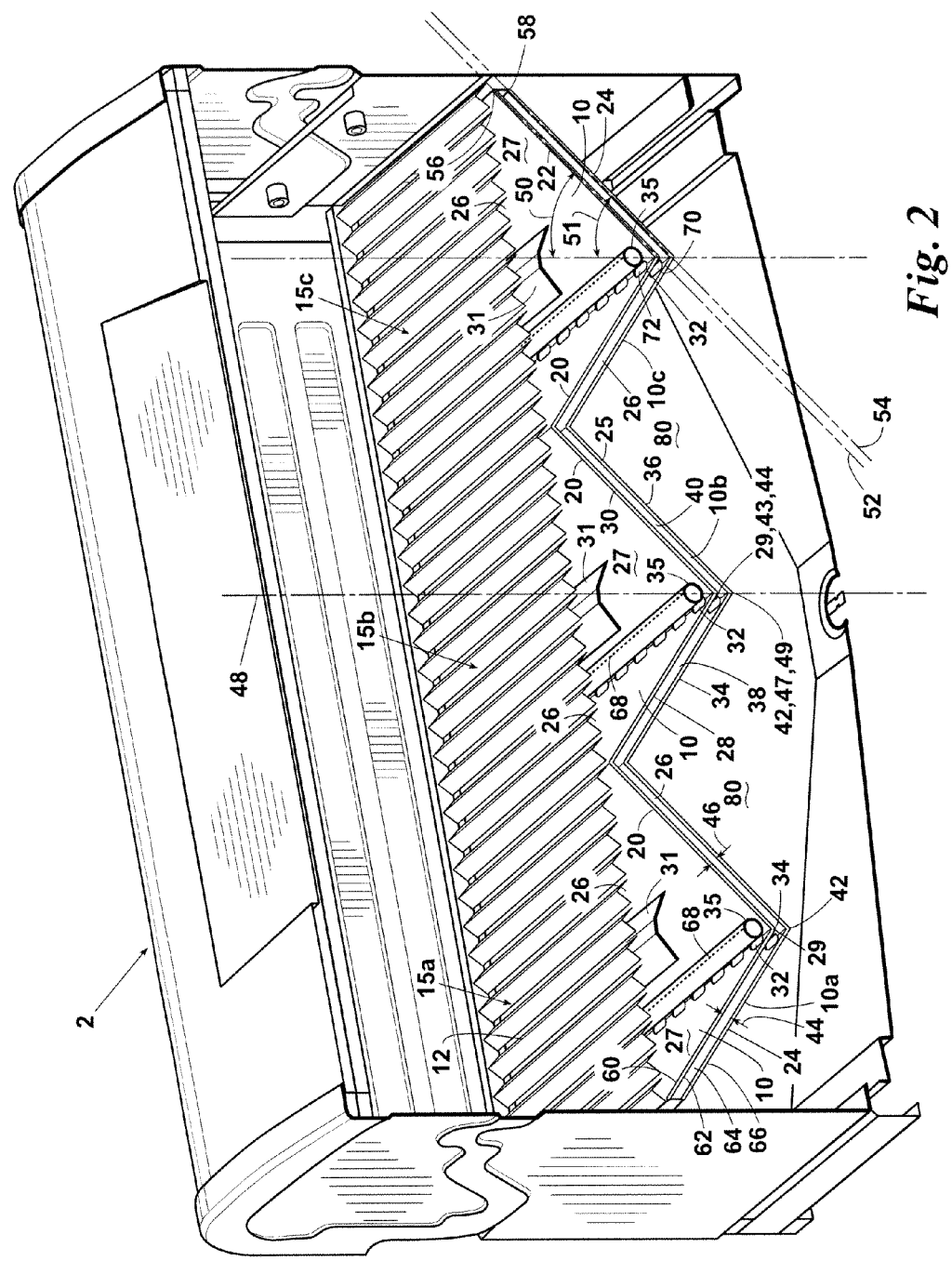
FIG. 2 is a cutaway elevational front perspective view of the inventive grill 2.

An embodiment 2 of an inventive grill for outdoor cooking is depicted in FIGS. 1 and 2. The inventive grill 2 preferably comprises: a grill housing 4; a pivotable lid, or other cover 6, for opening and closing the top of the grill housing 4; at least one inventive V-shaped burner assembly 10 positioned in the grill housing 4; a food support grate 12, preferably positioned at or proximate to the top(s) of the inventive burner assembly or assemblies 10; a stand 14 for supporting the grill housing 4; and a grease drip pan 16 provided below the burner assembly or assemblies 10. The embodiment of the inventive grill 2 depicted in FIG. 2 includes a series of three inventive burner assemblies 10 which are positioned adjacent to each other in a parallel arrangement.

The embodiment 10 of each of the inventive V-shaped burner assemblies shown in FIG. 2 comprises: a double-walled firebox 20 which extends longitudinally in the grill housing 4 from the front to the back of the housing 4 and has a V-shaped cross-section 25 as illustrated in FIG. 2; a combustion chamber 27 within the V-shaped firebox 20 which has an upper discharge opening 26 at the top of the V-shaped firebox 20; a discharge opening width 23; a burner element 35 extending longitudinally in the V-shaped firebox 20 for delivering fuel or a fuel and air mixture into the combustion chamber 27; a longitudinally extending flame taming shield 31 positioned between the burner element 35 and the food support grate 12; and one or more (preferably a series) of air flow passages 32 preferably provided in the bottom 34 of the V-shaped firebox 20 for delivering air (preferably secondary air) into the combustion chamber 27.

The double-walled, V-shaped firebox 20 used in the inventive burner assembly 10 preferably comprises: a longitudinally extending inner combustion chamber containment wall 22 having a V-shaped vertical cross-section; a longitudinally extending, V-shaped outer insulating wall 24 which is positioned outside of and preferably runs substantially parallel to the inner wall 22; and a longitudinally extending insulating gap 26 which is provided between the inner wall 22 and the outer wall 24 and also has a V-shaped vertical cross-section. The combustion chamber 27 of the burner assembly 10 is defined by (i.e., contained within the interior of) the combustion chamber containment wall 22.

The V-shaped inner combustion chamber containment wall 22 has a longitudinally extending left side 28 and a longitudinally extending right side 30. The left and right sides 28 and 30 extend upwardly from the bottom 29 of the inner wall 22. The left and right sides 28 and 30 preferably extend upwardly to, and also preferably define the left and right side limits of, the combustion chamber discharge opening 26 at the top of the firebox 20. In addition, in the cross-sectional view, the left and right sides 28 and 30 diverge outwardly, in a substantially V-shaped manner, from, or proximately from, the bottom of the combustion chamber containment wall 22 to, or proximately to, the combustion chamber discharge opening 26. The outward divergence of the left and right sides 28 and 30 preferably begins not more than ¼ inch from, more preferably not more than ⅛ inch from, and most preferably at, the bottom 29 of the inner wall 22. Similarly, the outward divergence of the left and right sides 28 and 30 preferably ends not more than ¼ inch from, more preferably not more than ⅛ inch from, and most preferably at, the upper discharge opening 26. Consequently, although in the cross-sectional view a short lower end portion and/or a short upper end portion of the sides 28 and 30 can be vertical or otherwise non-diverging, the sides 28 and 30 will most preferably be continuously diverging, in a straight or a curved manner, from the bottom 29 the inner wall 22 to the upper discharge opening 26.

The V-shaped outer insulating wall 24 also comprises longitudinally extending left and right sides 34 and 36 which preferably run substantially parallel to and are spaced apart from the left and right sides 28 and 30 of inner combustion chamber containment wall 22. As a result, left and right insulating gaps 38 and 40 are formed between the inner and outer walls 22 and 24. The left and right sides 34 and 36 of the outer wall 24 extend upwardly from the bottom 42 of the outer wall 24. The bottom 42 of the outer wall 24 is preferably positioned below and spaced apart from the bottom 29 of the inner wall 22. As with the inner wall 22, the left and right sides 34 and 36 of the outer wall 24 also diverge outwardly from, or proximately from, the bottom 42 of the outer wall 24. The divergence preferably begins not more than ¼ inch from, more preferably not more than ⅛ inch from, and most preferably at, the bottom 42 of the outer wall 24.

The widths 44 and 46 of the left and right insulating gaps 38 and 40 of the double-walled, V-shaped firebox 20 will preferably be at least 0.2 inch. The widths of the insulating gaps will more preferably be in the range of from about 0.2 to about 0.6 inch and will most preferably be about 0.5 inch. The insulating gaps 38 and 40 will preferably be air insulating gaps or other empty (i.e., unfilled) gaps but can alternatively be filled or partially filled with one or more layers of insulating material. Examples of suitable insulating materials include, but are not limited to high temperature insulating materials such as fiber glass, calcium silicate, cellular glass, mineral wool, etc.

Regardless of whether the insulating gaps 38 and 40 are empty or have an insulating material therewith, the combustion chamber containment wall 22 and the insulating gaps 38 and 40 are preferably formed so that no combustion gas from the combustion chamber 27 is allowed to enter the gaps 38 and 40.

As illustrated in FIG. 2, in the vertical cross-section of the firebox 20, the left and right sidewalls 28 and 30 of the inner wall 22 and the left and right sidewalls 34 and 36 of the outer wall 24 each extend upwardly and diverge outwardly from the respective bottoms 29 and 42 of the inner and outer walls in a substantially straight line. It will be understood, however, that the upwardly diverging left and right sides 28 and 30 of the V-shaped inner wall 22 and the upwardly diverging left and right sides 34 and 36 of the V-shaped outer wall 24 can alternatively be curved (e.g., convex or concave) or have other nonlinear shapes, so long as they retain a diverging, substantially V-shaped appearance.

In addition, in the V-shaped cross-section of the combustion chamber containment wall 22, the left and right sides 28 and 30 of the combustion chamber containment wall 22 have lower ends 43 and 44 at the bottom 29 of the wall 22 which are in close proximity to each other (i.e., are not more than ½ inch apart). The lower ends 43 and 44 of the sides 28 and 30 of the combustion chamber containment wall 22 are preferably not more than ⅜ inch apart. The lower ends 43 and 44 are more preferably not more than ¼ inch apart and are still more preferably not more than ⅛ inch apart. Most preferably, the lower ends 43 and 44 of the left and right sides 28 and 30 of the combustion chamber containment wall 22 and the bottom 29 of the wall 22 are all located at and constitute, or are at least substantially located at and substantially constitute, a common, shared point which will thus define, or at least substantially define, a bottom vertex point for the substantially V-shaped inner wall 22.

Similarly, in the substantially V-shaped cross-section of the firebox outer insulating wall 24, the left and right sides 34 and 36 of the outer wall 24 have lower ends 47 and 49 at the bottom 42 of the outer wall 24 which are preferably not more than 1 inch apart. The lower ends 47 and 49 of the sides 34 and 36 of the outer wall 24 are more preferably not more than ½ inch apart. The lower ends 47 and 49 and are more preferably not more than ¼ inch apart and are still more preferably not more than ⅛ inch apart. Most preferably, the lower ends 47 and 49 of the left and right sides 34 and 36 of the outer wall 24 and the bottom 42 of the outer wall 24 are all located at and constitute, or are at least substantially located at and substantially constitute, a common shared point which will thus define, or at least substantially define, a bottom vertex point for the substantially V-shaped outer wall 24.

It will thus be understood that the bottoms 29 and 42 of the combustion chamber containment wall 22 and the insulating outer wall 24, as seen in the vertical cross-section of the V-shaped firebox 20, can be short segments (preferably not more than ½ inch, more preferably not more than ¼ inch, and more preferably not more than ⅛ inch) which are flat or curved, but will most preferably constitute, or at least substantially constitute, points which form vertices for the combustion chamber containment wall 22 and the outer insulating wall 24.

Consequently, as used here and in the claims, it will be apparent that the term "substantially V-shaped" refers to and encompasses strict V-shapes, other straight V-shapes, rounded or curved V-shapes, and V-shapes having short segments which are straight and/or rounded.

However, regardless of whether the bottoms 29 and 42 of the inner and outer walls 22 and 24 are pointed, flat, or rounded, or whether the sides 28, 30, 34, and 36 of the inner and outer walls 22 and 24 are substantially straight or curved, the V-shaped firebox 20 will preferably be substantially symmetrical with respect to a central vertical plane 48 extending longitudinally through the firebox 20 and will preferably be configured such that, for each side 28, 30, 34, and 36, the angle of divergence 50 or 51 from the vertical plane 48 of a line 52 or 54 extending from the lower end 43, 44, 47, or 49 of the side 28, 30, 34, or 36, through the outermost endpoint 56 or 58 of the side 28, 30, 34, or 36 will not be greater than 70° and will more preferably be in the range of from about 35° to about 65°. The angle of divergence 50 or 51 will most preferably be in the range from about 40° to about 50°.

In addition, although the sizes and shapes of the substantially V-shaped inner wall 22 and the substantially V-shaped outer wall 24 of the double-walled burner assembly 10 need not be identical, the shapes and/or the sizes of the V-shaped inner wall 22 and the V-shaped outer wall 24 will most preferably be the same or substantially the same.

The inner combustion chamber containment wall 22 will preferably have sufficient sturdiness and heat resistance to provide structural support for the burner assembly 10 and to withstand the combustion temperatures and conditions produced in the combustion chamber 27. Examples of materials suitable for forming the substantially V-shaped inner wall 22 of the firebox 20 include, but are not limited to stainless steel, cold rolled steel, porcelain coated steel, etc.

The outer insulating wall 24 can be, but for cost reduction and other reasons preferably will not be used to provide significant structural support for the burner assembly 10. Consequently, examples of materials preferred for forming the V-shaped outer wall 24 of the firebox 20 include, but are not limited to aluminized steel, galvanized steel, bright finish stainless steel, any highly polished steel etc.

Preferably, for cost reduction and improved operation, the inner and outer walls 22 and 24 of the firebox 20 will be formed and/or coated in a manner such that: (a) the inner surface 60 of the inner wall 22 has an emissivity of anywhere from 0.01 to 0.95, (b) the outer surface 62 of the inner wall 22 will have an emissivity of not more than 0.6, (c) the inner surface 64 of the outer wall 24 will have an emissivity of not more than 0.6, and (d) the outer surface 66 of the outer wall 24 will have an emissivity of not more than 0.6.

To achieve these preferred emissivity characteristics of the inner surface 60 and the outer surface 62 of the inner wall 22, the inner wall 22 will most preferably be formed of stainless steel. As another example, porcelain coated steel can be used with some minor reduction in performance.

To the achieve the above-described preferred emissivity characteristics for the inner surface 64 and outer surface 66 of the outer wall 24, the outer wall 24 will most preferably be formed of polished aluminized steel.

Although other types of burner elements and flame port arrangements can alternatively be used, the burner element 35 used in the inventive burner assembly 10 will preferably be a substantially straight tube-type burner (e.g., a cylindrical pipe or other conduit, preferably having an inside diameter of about ½ inch, or preferably any other NPS ½ inch pipe) which extends longitudinally in the firebox 20. The burner element 35 has one or more, preferably a series, of flame discharge ports 68 therein for delivering fuel, preferably a fuel and air mixture, into the firebox combustion chamber 27. The burner element 35 is preferably substantially centrally located in the firebox combustion chamber 24 with the burner port(s) 68 preferably being formed longitudinally along the top of the burner element 35, most preferably at least substantially in alignment with the vertical plane of symmetry 48.

The burner element 35 will also preferably extend longitudinally above the air passage(s) 32 formed along the longitudinally extending bottom 34 of the firebox 20. The air passage(s) 32 through the bottom 34 of the firebox 20 will preferably comprise (a) one or more, preferably a series of, openings 70 formed through and along the longitudinally extending bottom 42 of the outer insulating wall 24 and (b) one or more, preferably a series, of openings 72 formed through and along the longitudinal extending bottom 29 of the inner combustion chamber containment wall 22. The air opening(s) 72 in the bottom 29 of the inner wall 22 is/are in fluid communication with the one or more air openings 70 formed through the bottom of the outer wall 24. The air opening(s) 72 in the bottom 29 of the inner wall 22 and the air opening(s) 70 in the bottom 42 of the outer wall 24 will also preferably be at least substantially in alignment with the vertical plane of symmetry 48.

By preferably using a single row of burner discharge ports 68 running along the top of a tube burner element 35, the inventive burner assembly 10 is capable of operating at a desired or necessary lower fuel input rate for the inventive low volume firebox 20 in order to optimize the combustion chamber temperature and ensure sufficiently complete combustion to meet CO emission requirements while at the same time maintaining a stable flame under wind certification conditions. In the preferred single row arrangement, the flame discharge port(s) 68 and the box air openings 70 and 72 are all substantially in alignment with the vertical plane of symmetry 48. This top ported design increases the life of the burner element 35 by substantially preventing any flame wrap around from the sides of the burner element to the top thereof which happens on the side ported burners.

The configuration, the angles of divergence 50 and 51, and the straight, curved, or other diverging shape of the left and right sides 28 and 30 of the combustion chamber combustion wall 22 will preferably be such that the total volume of the substantially V-shaped firebox combustion chamber 27 (i.e., the total combustion gas receiving volume of the firebox 20) does not exceed 65% of the volume of a corresponding rectangular firebox having an identical depth, an identical upper discharge opening area, and an identical discharge opening width. More preferably, the total volume of the combustion chamber 27 of the V-shaped firebox 20 will not be greater than 60%, more preferably less than 55%, more preferably less than 52%, and more preferably not more than 50%, of the volume of the corresponding rectangular firebox. The volume of the combustion chamber 27 will preferably be in a range of from about 25% to about 60%, more preferably from about 35% to about 55%, and most preferably from about 40% to about 52%, of the volume of the rectangular firebox having an identical depth, an identical upper discharge opening area, and an identical discharge opening width.

The creation of a V-shaped firebox having a volume of less than 50% of the corresponding rectangular box can be accomplished, for example, by using a curved V-shape, most preferably a bird wing V-shape, as discussed below. In addition, the inventive V-shaped burner can provide an even further reduction on firebox volume by allowing the depth of the combustion chamber to be significantly reduced without causing a flame impingement failure.

The firebox combustion chamber 27 and the positioning of the burner element 35 therein will preferably be such that the top port(s) 68 of the burner element 35 are spaced at least 2 inches, more preferably from about 2 to about 4 inches and most preferably from about 2 to about 3 inches, from the upper discharge opening 26 at the top of the firebox 20. The bottom of the burner element 35 will preferably be spaced at least ½ inches above the bottom 29 of the firebox inner wall 22. The bottom of the burner element 35 will more preferably be spaced from about ½ to about ¾ inches above the bottom 29 of the firebox inner wall 22.

The flame taming shield 31 of the inventive burner assembly 10 will preferably be positioned at least ½ inches, more preferably from about ½ to about 1 inch, above the port(s) 68 in the top of the burner element 35. The flame taming shield 30 will also preferably be positioned at least 1 inch, more preferably from about 1 to about 2 inches, below the firebox discharge opening 26.

The fuel used in the inventive burner assembly 10 will preferably be propane or other fuel of a type suitable for use in gas powered grills and will also preferably be mixed with primary air prior to being delivered into the firebox combustion chamber 27 by the burner element 35. In accordance therewith, by way of example, the inventive grill 2 and the inventive burner assembly 10 illustrated in FIGS. 1 and 2 further comprise: a fuel supply line 74 for delivering fuel from a fuel tank or other fuel source (not shown); a control knob 76 (preferably a separate control knob for each burner assembly 10) for selectively controlling the fuel rate and for shutting off the flow of fuel to the burner element 35; and a venturi element or other air induction or injection device 78 for drawing or injecting primary air into the burner element 35 for mixture with the fuel.

Because of the significantly reduced firebox combustion chamber volume and the configuration of the inventive V-shaped burner assembly 10, the inventive burner assembly 10 requires significantly less fuel to operate than previous box-type burners or other burners used in infrared systems, and provides a higher percentage of infrared radiant cooking energy. When used with an infrared cooking grate comprising a solid glass plate having inverted U-shaped cooking ribs thereon and without any grill lid, the inventive double-walled, V-shaped burner assembly 10 shown in FIG. 2 will provide an overall thermal efficiency of at least 40% (more preferably at least 42%, and more preferably at least 45%) with at least 75%, (more preferably at least 78% and more preferably at least 80%) of the total cooking energy flux delivered to the cooking zone on top of the cooking grate being in the form of infrared radiant energy.

The food support grate 12 depicted in FIG. 2 for the inventive grill 2 is a one piece infrared cooking grate. It will be understood, however, that other types of infrared cooking grates can be used in the inventive grill 2 including, for example, two piece infrared grates or infrared cooking grates having more than two pieces.

Figure 3:
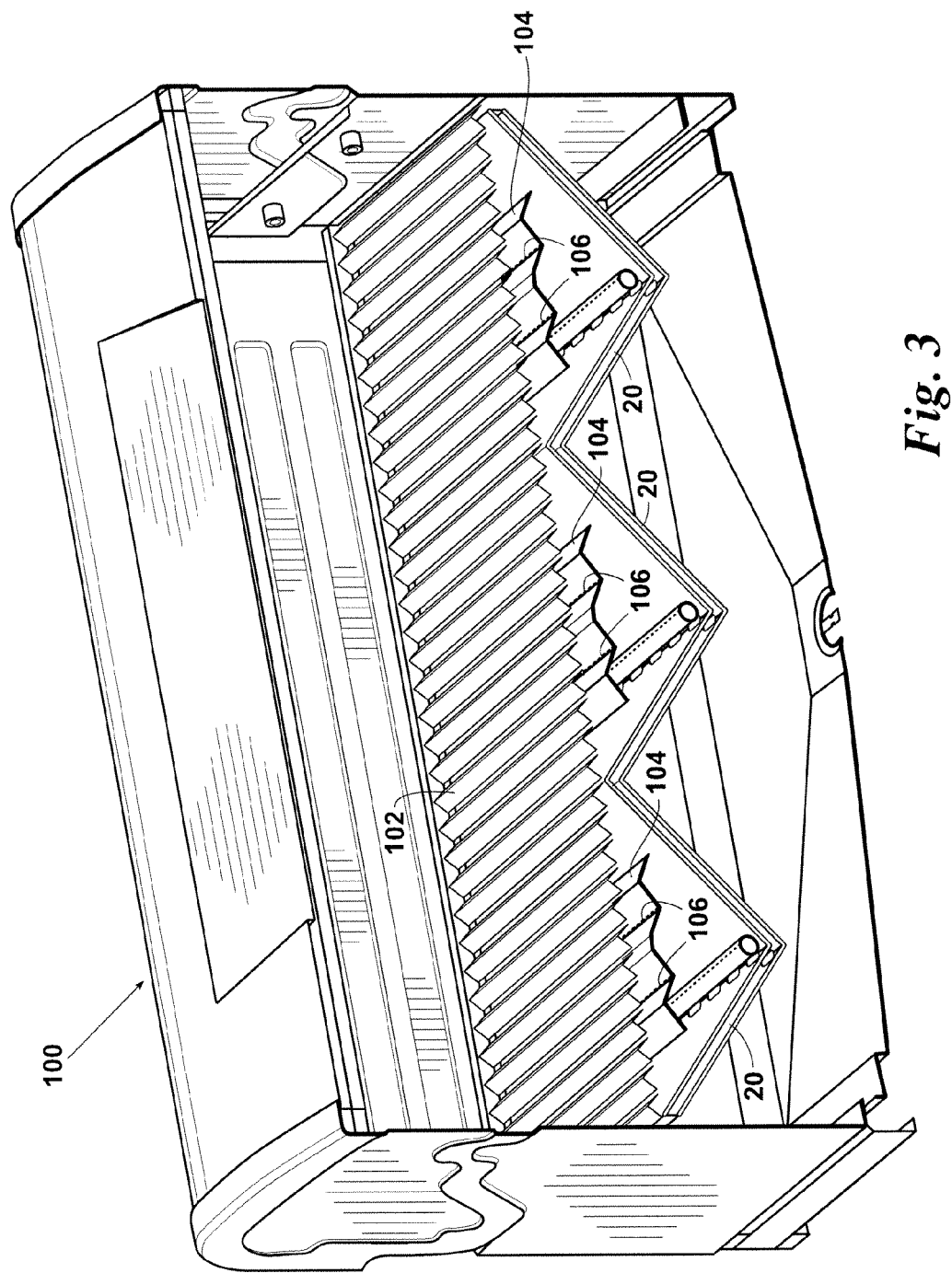
FIG. 3 is a cutaway elevational front perspective view of an alternative embodiment 100 of the grill provided by the present invention using a convective cooking grate 102.

An alternative embodiment 100 of the inventive grill is depicted in FIG. 3. The inventive grill 100 is substantially identical to the inventive grill 2 except that (a) the food support grate 102 used in the inventive grill 100 is a convective cooking grate and (b) the flame taming shields 104 employed in the inventive convective grill assembly 100 are wider than those used in the inventive infrared grill assembly 2. The flame taming shields 104 of the inventive convective grilling system 100 also preferably have flow openings 106 formed therethrough to allow grease drippings to drain therefrom and/or permit some degree of upward gas flow through the shield 104. The ability to also use the inventive V-shaped burner for convective cooking using a convective (i.e., open) cooking grate is a significant benefit and advantage of the inventive burner assembly versus the prior art burners used heretofore in infrared cooking grills.

Because of the greater amount of flow which will occur through an open convective cooking grate 102 as used in grill 100, versus an infrared cooking grate 12 as used in grill 2, the wider flame taming shields 104 employed in the convective grill 100 are preferably used in order to better distribute the combustion gas before it reaches the bottom of the cooking grate 102. This helps to ensure that the flow through the open convective cooking grate 102 is evenly distributed and does not simply bypass the portions of the grate located above the outer areas of the burner firebox.

In contrast, because the infrared grate system 12 of grill 2 will typically allow much less, or perhaps even no, air flow therethrough, the infrared grate 12 itself is of much greater assistance in distributing the heat and combustion gas flow produced by the burner element 35. Consequently, although a flame taming shield 30 will preferably still be used in the infrared system 2 in order to further ensure even heating across the entire cooking grate, the shield 30 in the infrared system can be significantly narrower in width.

Figure 9:
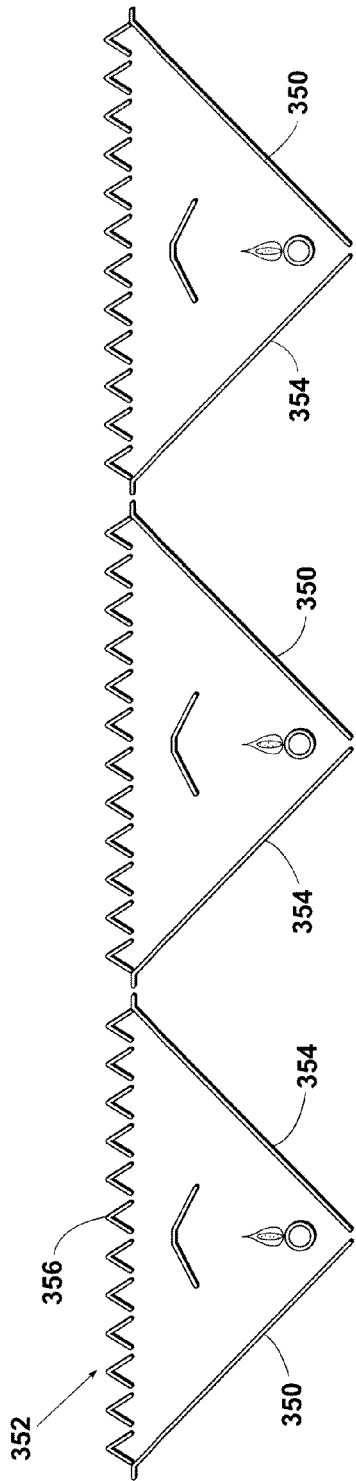
FIG. 9 schematically illustrates an alternative embodiment 352 of the inventive grilling system using three adjacent single-walled V-shaped burner assemblies 350.
Figure 8:
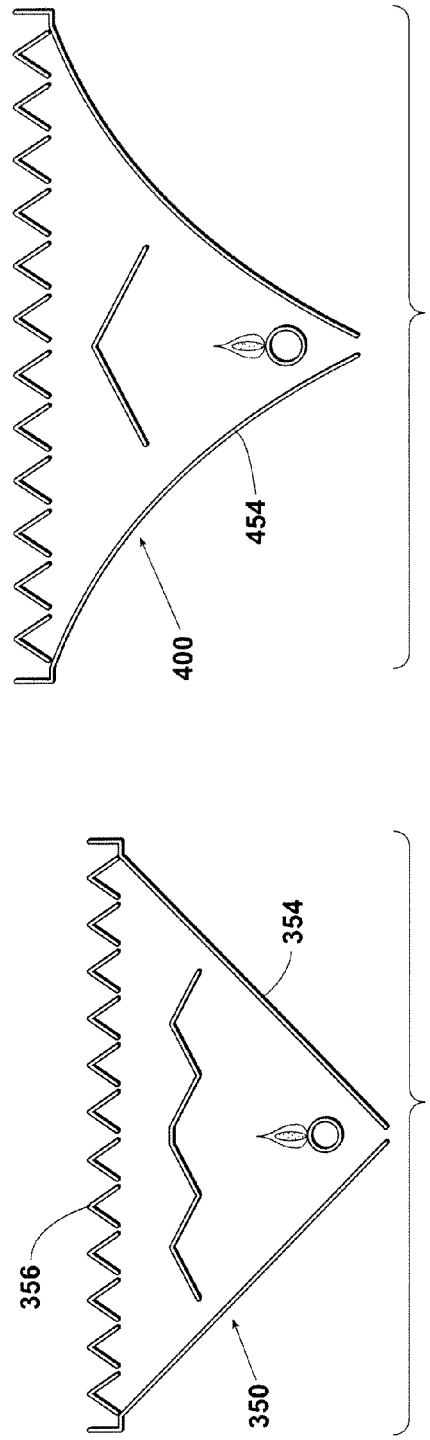
FIG. 8 is a cutaway elevational cross-sectional view of an alternative single-walled embodiment 350 of the inventive V-shaped burner assembly.

An alternative embodiment 350 of the inventive V-shaped burner and a grilling system 352 using a plurality (e.g., three) of the inventive V-shaped burners 350 are illustrated in FIGS. 8 and 9. The burner assembly 350 and grilling system 352 are identical to the inventive burner assembly 10 and grill 2 described above except that the substantially V-shaped burner assembly 350 is a single-walled burner which does not have an insulating wall positioned outside of the combustion chamber containment wall 354. Consequently, if the cooking grate 356 used in the grilling system 352 is an infrared cooking grate having an open area of 5% and the grill lid is closed, the inventive burner assembly 350 will provide (a) a total energy flux of at least 9.4 KW/m$^2$ (more preferably at least 9.6 KW/m$^2$), and (b) an overall thermal efficiency of at least 57%, (more preferably at least 59%, more preferably at least 60%, more preferably at least 65%, and more preferably at least 70%) with (c) at least 72% (more preferably at least 74%, more preferably at least 75%, and more preferably at least 80%) of the total cooking energy flux delivered to the cooking area being infrared radiant energy.

Alternatively, if the grate 356 is a convective cooking grate having an open area of 20%, the inventive burner assembly 350 will provide (a) a total energy flux of at least 9.4 KW/m$^2$ (more preferably at least 9.6 KW/m$^2$) and (b) a thermal efficiency of at least 57%, (more preferably at least 59%, more preferably 60%, and more preferably 65%) with an infrared percentage of at least 60% (more preferably at least 62%, more preferably at least 64%, and more preferably at least 65%).

Another alternative grilling assembly 105 using an adjacent pair of burner assemblies formed in accordance with an embodiment 110 of the present invention is schematically illustrated in FIG. 4. Each of the inventive double-walled, V-shaped burner assemblies 110 depicted in FIG. 4 is essentially the same as the inventive burner assembly 10 depicted in FIG. 2 except that (a) the left and right sides 128 and 130 of the inner combustion chamber containment wall 122 and the left and right sides 134 and 136 of the outer insulating wall 124 of the firebox 127 are curved such that the V-shaped cross-section of the firebox 120 is a birdwing V shape and (b) the particular embodiment shown in FIG. 4 uses a wider flame taming shield 131 of a type better suited for a convective cooking grate 112. The use of a birdwing or other curved V shape of this type can be beneficial in that, for example, the volume of the firebox 127 can be reduced to a size which is even less than 50% of the volume of a corresponding rectangular box having an identical depth, an identical discharge opening area, and an identical discharge opening width. The degree of curvature of the left and right sides of the curved V firebox 27 can be such as to provide a working firebox volume as small as even 25% of the volume of the corresponding rectangular box.

Figure 10:
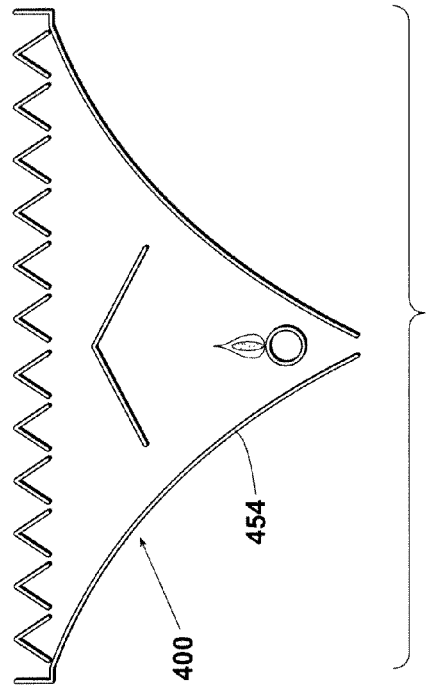
FIG. 10 is a cutaway elevational cross-sectional view of an alternative single-walled embodiment 400 of the inventive curved V burner assembly.

Yet another alternative embodiment 400 of the inventive curved V burner is illustrated in FIG. 10. The inventive curved V burner assembly 400 is identical to the curved V burner assembly 110 except that the burner assembly 400 is a single-walled burner which does not have an insulating wall positioned outside of the combustion chamber containment wall 454.

By way of example, but not by way of limitation, when producing an individual double-walled, V-shaped burner assembly 10 or double-walled birdwing V-shaped assembly 110, the double-walled firebox of the single burner assembly will preferably be fabricated by the steps of deep drawing or lap welding inner wall 22 and outer wall 24 from sheet metal. The pieces can be coated, if desire, and then attached to the main frame or walls of the grill housing. A top ported ½" to ⅝" tube burner can be screwed or clipped to the bottom of the firebox. A formed flame taming shield can be clipped in place and finally the weld assembled cooking grate will be placed freely on the top of firebox edges.

By way of example, but not by way of limitation, when producing a set of multiple, adjacent, parallel, double-walled burner assemblies 10 as illustrated in FIG. 2 or double-walled birdwing V-shaped assemblies 110 as illustrated in FIG. 4, the double-walled, parallel, adjacent fireboxes of the multiple burner assemblies can be fabricated, for example, by attaching together multiple modular units side-by-side either by screws or magnets. Alternatively, as another example, multiple fireboxes can be formed as a single corrugated firebox either by deep drawing a piece of sheet metal or by lap welded fabrication.

Regardless of whether the inventive grills 2, 100, 105, 352, and 402 employ straight V-shaped burner assemblies, birdwing V-shaped burner assemblies, or other V-boxes, the inventive grills 2, 100, 105, 352, and 402 provide significant improvements in the ability to substantially segregate the cooking zones above the individual burners.

Thus, for example, in reference to FIG. 2, the inventive double-walled, V-shaped burner assemblies 10 are effective, due to their construction and configuration as described above, for significantly preventing the operation of the left side burner assembly 10a from affecting the cooking zone 15b above the central burner assembly 10b or from affecting the cooking zone 15c above right side burner assembly 10c. Similarly, the operation of central burner assembly 10b and/or the right side burner assembly 10c is significantly prevented from affecting the cooking zone 15a above the left side burner assembly 10a. The cooking zones 15a, 15b, and 15c are located at or proximate to the top of the food support grate 12.

Such segregation of the cooking zones 15a, 15b, and 15c not only improves thermal efficiency, but also improves and enhances the ability to conduct separate, distinct cooking operations above the individual burner assemblies 10a, 10b, and 10c at significantly different burner settings.

The ability of the inventive system to minimize the heat carryover between burner assemblies, and thus significantly reduce the effect which the operation of any individual burner assembly has on other cooking zones, can be illustrated using the inventive infrared grill 2 shown in FIG. 2 with an infrared cooking grate with 5% open area, for example, by: (a) operating the right side burner assembly 10a at a high cooking setting wherein a high setting rate (e.g., about 35 BTU/hour per square inch) is delivered to the firebox combustion chamber 27 of the burner assembly 10a; (b) operating the central burner assembly 10b at a lower cooking setting such that one-half of the high rate of fuel delivered to burner assembly 10a is delivered to the central burner assembly 10b; and (c) leaving the right side burner assembly 10c off so that no fuel is delivered thereto.

Due to the construction of the inventive burner assemblies 10a, 10b, and 10c wherein the V-shaped fireboxes 20 are more isolated and are separated by gaps 80 having an inverted V-shape, the carryover of heat energy from any one burner assembly to the others will be significantly reduced such that a total energy flux transmitted into the cooking plane 15b above the central burner assembly 10b will not be greater than 60% (more preferably not more than 58% and more preferably not more than 55%) of the total energy flux transmitted into the cooking plane 15a above the left side burner assembly 10a. At the same time, the total energy flux transmitted into the cooking zone 15c above the right side burner assembly 10c, which is turned off, will not be greater than 16% (more preferably not more than 14% and more preferably not more than 12%) of the total energy flux transmitted into the central cooking zone 15b.

Similarly, if when operating burner assemblies 10a, 10b, and 10c in this same manner, the infrared food support grate 12 of FIG. 2 is replaced with a convective grate 102 as illustrated in FIG. 3 having 20% open area, the total energy flux transmitted into the central cooking zone 15b will not be greater than 55% (more preferably not more than 52% and more preferably not more than 51%) of the total energy flux transmitted into the left side cooking zone 15a. At the same time, the total energy flux transmitted into the right side cooking zone 15c will not be greater than 10% (more preferably not more than 8% and more preferably not more than 6%) of the total energy flux into the central cooking zone 15b.

In another example using the inventive grill 2 illustrated in FIG. 2 having an infrared cooking grate 12, if the left side burner assembly 10a is operated at the high cooking setting and the central burner assembly 10b and the right side burner assembly 10c are both turned off, the construction of the inventive burner assemblies 10a, 10b, and 10c and the effective separation of the V-shaped fireboxes 20 thereof are such that, with an infrared cooking grate having 5% open area, the total energy flux into the central cooking zone 15b above the infrared grate 12 will not be greater than 13% (more preferably not more than 10%) of the total energy flux into the left side cooking zone 15a. Similarly, under this same operation but using the convective cooking grate 102 having 20% open area, the total energy flux transmitted into the central cooking zone 15b will not be greater than 8% (more preferably not more than 5%) of the total energy flux transmitted into the left side cooking zone 15a.

Example I

The three-zone infrared grills 2 and 100 shown in FIGS. 2 and 3 employing double-walled, straight V-shaped burner fireboxes 20 were compared to (a) an otherwise identical three-burner grill assembly using a firebox similar to prior art partitioned, rectangular firebox 200 as illustrated in FIG. 5 except that double-walled insulating partitions between the cooking zones and a double outer wall were used and (b) an otherwise identical three-burner grill using the modified double-walled version of the non-partitioned, rectangular firebox 250 illustrated in FIG. 6.

In all of the grills 2, 100, 200 and 250, the burner assemblies had the same depth and had upper discharge opening areas which were identical in size.

In each of the grill systems, all three burners were operated using a propane and air mixture at a fuel and air input setting of 16.23 KW/m$^2$ using both (a) an infrared cooking grate with 5% open area and (b) an open convective cooking grate with 20% open area. Experimental data showing the comparative performance (with the grill lid closed) of the inventive double-walled, V-shaped system versus the grill using the partitioned rectangular firebox and the grill using the non-partitioned rectangular firebox are provided in Table I.

Consequently, even when the rectangular fireboxes were improved by using double insulating walls, the cooking energy flux provided by the inventive double-walled, V-shaped burner assembly was: (a) 8.36% greater than the flux provided by the rectangular, partitioned burners when using the infrared cooking grate, (b) 5.38% greater than the flux provided by the partitioned, rectangular burners when using the convective cooking grate, (c) 11.12% greater than the flux provided by the non-partitioned, rectangular burners when using the infrared cooking grate, and (d) 12.02% greater than the flux provided the non-partitioned, rectangular burners when using the convective cooking grate.

In addition, the portion of the total cooking energy flux desirably constituting infrared radiant energy when using the inventive double-walled, V-shaped burner assemblies was: (a) 6.83% greater than provided by the partitioned, rectangular burners when using the infrared cooking grate, (b) 6.78% greater than provided by the partitioned, rectangular burners when using the convective cooking grate, (c) 7.58% greater than provided by the non-partitioned, rectangular burners when using the infrared cooking grate, and (d) 17.14% greater than provided by the non-partitioned, rectangular burners when using the convective cooking grate.

Example II

The inventive double-walled, V-shaped burner assemblies 10 of FIGS. 1 and 2 are again compared to (a) the otherwise identical grill using the rectangular, partitioned firebox system described in Example I and (b) the otherwise identical grill using the rectangular, non-partitioned box described in Example I. In this test, the three parallel burner assemblies in each of these systems were operated using a propane and air mixture such that (a) the left side burner was placed at a high fuel and air input setting of 16.23 KW/m$^2$, (b) the central burner assembly was operated at a lower setting providing one-half of the fuel input rate as the high setting of the left side burner assembly, and (c) the right side burner assembly was turned off. Comparative runs were performed with both (a) an infrared cooking grate having 5% open area and (b) an open convective cooking grate with 20% open area.

Experimental data showing the amount of flux carryover between the three cooking zones for the inventive double-walled, V-shaped system versus the grill using the partitioned, rectangular firebox system and the grill using the non-partitioned, rectangular system are shown in Table II.

TABLE I

| | Inventive V-Shaped Firebox | | | Rectangular Partitioned Box | | | Rectangular Non-Partitioned Box | | |
|---|---|---|---|---|---|---|---|---|---|
| | Energy Flux to Cooking Zones (KW/m$^2$) | Thermal Efficiency | % IR | Energy Flux to Cooking Zones (KW/m$^2$) | Thermal Efficiency | % IR | Energy Flux to Cooking Zones (KW/m$^2$) | Thermal Efficiency | % IR |
| Infrared Cooking Grate | 9.59 | 59.1 | 74.94 | 8.85 | 54.5 | 70.15 | 8.63 | 53.1 | 69.6 |
| Convective Cooking Grate | 9.60 | 59.2 | 64.65 | 9.11 | 56.1 | 60.54 | 8.57 | 52.8 | 55.1 |

TABLE II

| | Inventive V-Shaped Fireboxes | | | Partitioned Rectangular Fireboxes | | | Non-Partitioned Rectangular Firebox | | |
|---|---|---|---|---|---|---|---|---|---|
| | Left Cooking Zone (High) | Central Cooking Zone (Low) | Right Cooking Zone (Off) | Left Cooking Zone (High) | Central Cooking Zone (Low) | Right Cooking Zone (Off) | Left Cooking Zone (High) | Central Cooking Zone (Low) | Right Cooking Zone (Off) |
| Flux For Infrared Grate (KW/m$^2$) | 8.59 | 4.63 | 0.58 | 7.16 | 4.30 | 1.21 | 5.70 | 3.85 | 2.63 |

TABLE II-continued

|  | Inventive V-Shaped Fireboxes | | | Partitioned Rectangular Fireboxes | | | Non-Partitioned Rectangular Firebox | | |
|---|---|---|---|---|---|---|---|---|---|
|  | Left Cooking Zone (High) | Central Cooking Zone (Low) | Right Cooking Zone (Off) | Left Cooking Zone (High) | Central Cooking Zone (Low) | Right Cooking Zone (Off) | Left Cooking Zone (High) | Central Cooking Zone (Low) | Right Cooking Zone (Off) |
| Flux For Convective Grate (KW/m$^2$) | 8.92 | 4.41 | 0.28 | 7.68 | 4.08 | 0.46 | 7.36 | 2.74 | 0.51 |
| Fuel/Energy Input % Ratio (vs. Fuel Input Rate For Left Cooking Zone) | 100% | 50% | 0% | 100% | 50% | 0% | 100% | 50% | 0% |
| Flux Output % Ratio For Infrared Grate (vs. Flux Output for Adjacent cooking zone on Immediate Left) | — | 54% | 13% | — | 60% | 28% | — | 68% | 69% |
| Flux Output % Ratio For Convective Grate (vs. Flux Output For Adjacent Cooking Zone on Immediate Left) | — | 49% | 6% | — | 53% | 12% | — | 37% | 19% |

The primary reason(s) for this significantly improved performance provided by the inventive V-shaped burner assemblies is that the V-shape of the burner firebox creates inverted V-shaped gaps 80 between the adjacent fireboxes 20 in the inventive grill which greatly reduce or prevent heat transfer between adjacent boxes.

Example III

A single, individual inventive double-walled, V-shaped burner assembly 10 as illustrated in FIG. 2 was compared to an otherwise identical burner using a prior art double-walled rectangular firebox 300 with angled reflectors 302 and 304 as illustrated in FIG. 7. The inventive V-shaped burner assembly and the prior art rectangular burner had identical depths and had upper discharge opening areas of the same width and size. Each of these burner assemblies was operated using a propane and air mixture at a fuel/energy input rate of 32.8 KW/m$^2$. Grills were tested using an infrared grate system comprising a solid glass plate radiator having inverted U-shaped cooking ribs thereon. The grills were operated without any lid. Experimental data show that the inventive double-walled, V-shaped burner operated at an average thermal efficiency of about 42.32% and provided a total heat flux of 13.91 KW/m$^2$ with 78.72% of the total heat flux being infrared radiant energy.

In comparison, the burner using the prior art double-walled, rectangular firebox 300 with angled deflectors 302 and 304 operated at an average thermal efficiency of about 38.42% and provided a total heat flux of 12.62 KW/m$^2$ with 76.19% of the total heat flux being infrared radiant energy.

Consequently, although the prior art firebox 300 included angled deflectors, the energy efficiency and infrared percentage obtained using the prior art firebox 300 were significantly less primarily due to: the greater volume of the prior art firebox 300; the amount of energy wasted in heating the volume beneath the deflectors 302 and 304; and the much improved combustion chamber provided by the inventive V-shaped firebox.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the invention as defined by the claims.

What is claimed is:
1. A grill comprising:
a housing having an interior wall which surrounds an interior of said housing and
a plurality of substantially parallel adjacent burner assemblies in said interior of said housing wherein each of said burner assemblies comprises:
(a) a firebox comprising a longitudinally extending combustion chamber containment wall which is positioned within and different from said interior wall of said housing and which defines a combustion chamber therein, said combustion chamber containment wall having a substantially V-shaped cross-section, said combustion chamber containment wall having an upper discharge opening, and said combustion chamber containment wall further comprising:
a longitudinally extending bottom spaced above and different from an interior bottom of said housing,
a longitudinally extending left side, and
a longitudinally extending right side,
wherein, as viewed in said substantially V-shaped cross-section of said combustion chamber containment wall, said left and said right sides extend upwardly from said bottom of said combustion chamber containment wall to said upper discharge opening, said left and said right sides also diverge outwardly from, or proximately from, said bottom of said combustion chamber containment wall to, or proximately to, said upper discharge opening of said combustion chamber containment wall, and said left and said right sides have lower ends at said bottom of said combustion chamber containment wall which are located at a shared point or are not more than ½ inch apart and (b) a burner element extending longitudinally in said combustion chamber above said longitudinally extending bottom of said combustion chamber containment wall and above said lower ends of said left and said right sides, said burner element having one or more discharge ports for delivering a fuel or a fuel air mixture into said combustion chamber.

2. The grill of claim 1 wherein said firebox further comprises a longitudinally extending insulating wall which is positioned within and is different from said interior wall of said housing and is positioned outside of said combustion chamber containment wall, said insulating wall having a substantially V-shaped cross-section and said insulating wall further comprising:
a longitudinally extending bottom spaced above and different from said interior bottom of said housing,
a longitudinally extending left side, and
a longitudinally extending right side,
wherein, as viewed in said substantially V-shaped cross-section of said insulating wall:
said bottom of said insulating wall is positioned below said bottom of said combustion chamber containment wall,
said left and said right sides of said insulating wall extend upwardly from, and diverge outwardly from or proximately from, said bottom of said insulating wall such that
(i) said left side of said insulating wall is positioned outside of and adjacent to said left side of said combustion chamber containment wall such that a left side insulating gap is formed between said left sides and
(ii) said right side of said insulating wall is positioned outside of and adjacent to said right side of said combustion chamber containment wall such that a right side insulating gap is formed between said right sides, and
said left and said right sides of said insulating wall have lower ends at said bottom of said insulating wall which are located at a shared point or are not more than ½ inch apart.

3. The grill of claim 1 wherein:
said combustion chamber containment wall has one or more air openings through and extending along said longitudinally extending bottom of said combustion chamber containment wall;
said burner element comprises a burner element conduit extending longitudinally above said one or more air openings formed through said longitudinally extending bottom of said combustion chamber containment wall; and
said one or more discharge ports in said burner element for delivering said fuel or said fuel and air mixture into said combustion chamber are formed through a longitudinally extending top of said burner element conduit.

4. The grill of claim 3 wherein:
said combustion chamber containment wall is substantially symmetrical with respect to a central vertical plane extending longitudinally through said firebox;
said one or more air openings through and extending along said longitudinally extending bottom of said combustion chamber containment wall are substantially in alignment with said central vertical plane; and
said one or more discharge ports formed through said longitudinally extending top of said burner element conduit are in alignment with said central vertical plane.

5. The grill of claim 1 wherein, in said substantially V-shaped cross-section of said combustion chamber containment wall, said longitudinally extending bottom of said combustion chamber containment wall is a bottom vertex at which said lower ends of said left and said right sides of said combustion chamber containment wall meet.

6. The grill of claim 1 wherein said substantially V-shaped cross-section of said combustion chamber containment wall is a curved birdwing shape wherein an interior surface of said right side of said combustion chamber containment wall is convex and an interior surface of said left side of said combustion chamber containment wall is convex.

7. The grill of claim 1 wherein:
said combustion chamber of said firebox of said burner assembly has a total receiving volume into which combustion gases produced by said burner element will enter;
said combustion chamber has a depth;
said upper discharge opening of said combustion chamber containment wall has a width and a total discharge opening area; and
said total receiving volume of said combustion chamber of said firebox of said burner assembly is not more than 60% of that of a rectangular firebox having an identical depth, an identical discharge opening area, and an identical discharge opening width.

8. The grill of claim 7 wherein said total receiving volume of said combustion chamber of said firebox of said burner assembly is less than 55% of that of said rectangular firebox having an identical depth, an identical discharge opening area, and an identical discharge opening width.

9. The grill of claim 7 wherein said total receiving volume of said combustion chamber of said firebox of said burner assembly is less than 52% of that of said rectangular firebox having an identical depth, an identical discharge opening area, and an identical discharge opening width.

10. The grill of claim 7 wherein said total receiving volume of said combustion chamber of said firebox of said burner assembly is less than 50% of that of said rectangular firebox having an identical depth, an identical discharge opening area, and an identical discharge opening width.

11. The grill of claim 1 wherein said grill further comprises a lid and an infrared cooking grate having a total open area of 5% and wherein for each of said burner assemblies, said burner element is configured and positioned, and said firebox and said V-shaped cross-section of said combustion chamber containment wall are configured in a manner such that, when said infrared cooking grate is positioned over said upper discharge opening of said combustion chamber containment wall and said lid is closed, said burner assembly will operate at a thermal efficiency of at least 57% to provide a total energy flux of at least 9.4 KW/m² in a cooking zone over said infrared cooking grate with at least 72% of said total energy flux being infrared radiant energy.

12. The grill of claim 1 wherein said grill further comprises a lid and a convective cooking grate having a total open area of 20%, and wherein for each of said burner assemblies, said burner element is configured and positioned, and said firebox and said V-shaped cross-section of said combustion chamber containment wall are configured in a manner such that, when said convective cooking grate is positioned over said upper discharge opening of said combustion chamber containment wall and said lid is closed, said burner assembly will operate at a thermal efficiency of at least 57% to provide a total energy flux of at least 9.4 KW/m$^2$ in a cooking zone over said convective cooking grate with at least 62% of said total energy flux being infrared radiant energy.

13. The grill of claim 1 wherein all of said left and said right sides and said bottoms of all of said combustion chamber containment walls of all of said adjacent burner assemblies are together formed of a continuous single sheet of material and two of said burner assemblies are adjacent to each other in said interior of said housing such that an inverted V-shaped gap is formed between said two burner assemblies in said continuous single sheet of material, said inverted V-shaped gap being configured such that when (i) only said two burner assemblies are operated in said grill, (ii) an infrared cooking grate having an open area of 5% is positioned over each of said two burner assemblies, (iii) a first of said two burner assemblies is operated at a highest cooking setting for said first burner assembly which will deliver a high setting rate of said fuel or said fuel and air mixture to said combustion chamber of said first burner assembly, and (iv) a second of said two burner assemblies is operated such that one-half of said high setting rate of said fuel or said fuel and air mixture is delivered to said combustion chamber of said second burner assembly, a total resulting energy flux transmitted into a cooking zone above said second burner assembly will not be greater than 60% of a total resulting energy flux transmitted into a cooking zone above said first burner assembly.

14. The grill of claim 13 wherein said grill also includes a third of said burner assemblies which is adjacent to said second burner assembly in said interior of said housing such that an inverted V-shaped gap is also formed between said third burner assembly and said second burner assembly in said continuous single sheet of material and said inverted V-shaped gaps between said first, said second, and said third burner assemblies are configured such that, when (i) an infrared cooking grate having an open area of 5% is also positioned over said third burner assembly, (ii) said first burner assembly is operated at said highest cooking setting, (iii) said second burner assembly is operated such that one-half of said high setting rate of said fuel or said fuel and air mixture is delivered to said combustion chamber of said second burner assembly, and (iv) none of said fuel or said fuel and air mixture is delivered into said combustion chamber of said third burner assembly, a total resulting energy flux transmitted into a cooking zone above said third burner assembly will not be greater than 16% of said total resulting energy flux transmitted into said cooking zone above said second burner assembly.

15. The grill of claim 13 wherein said inverted V-shaped gap between said two burner assemblies is also configured such that, when (i) only said first burner assembly is operated in said grill, (ii) an infrared cooking grate having an open area of 5% is positioned over said first burner assembly, (iii) said first burner assembly is operated at said highest cooking setting for said first burner assembly which will deliver said high setting rate of said fuel or said fuel and air mixture into said combustion chamber of said first burner assembly, (iv) an infrared cooking grate having an open area of 5% is also positioned over said second burner assembly, and (v) none of said fuel or said fuel and air mixture is delivered into said combustion chamber of said second burner assembly, a total resulting energy flux transmitted into said cooking zone above said second burner assembly will not be greater than 13% of a total resulting energy flux transmitted into said cooking zone above said first burner assembly.

16. The grill of claim 13 wherein said inverted V-shaped gap between said two burner assemblies is also configured such that, when (i) a convective cooking grate having a total open area of 20% is positioned over each said two burner assemblies, (ii) said first of said two burner assemblies is operated at said highest cooking setting for said first burner assembly which will deliver a high setting rate of said fuel or said fuel and air mixture to said combustion chamber of said first burner assembly, and (iii) said second of said two burner assemblies is operated such that one-half of said high setting rate of said fuel or said fuel and air mixture is delivered to said combustion chamber of said second burner assembly, a total resulting energy flux transmitted into said cooking zone above said second burner assembly will not be greater than 55% of a total resulting energy flux transmitted into said a cooking zone above said first burner assembly.

17. The grill of claim 16 wherein said grill also includes a third of said burner assemblies which is adjacent to said second burner assembly in said interior of said housing such that an inverted V-shaped gap is also formed between said third burner assembly and said second burner assembly in said continuous single sheet of material and said inverted V-shaped gaps between said first, said second, and said third burner assemblies are configured such that, when (i) a convective cooking grate having a total open area of 20% is also positioned over said third burner assembly, (ii) said first burner assembly is operated at said highest cooking setting, (iii) said second burner assembly is operated such that one-half of said high setting rate of said fuel or said and air mixture is delivered to said combustion chamber of said second burner assembly, and (iv) none of said fuel or said fuel and air mixture is delivered into said combustion chamber of said third burner assembly, a total resulting energy flux transmitted into a cooking zone above said third burner assembly will not be greater than 10% of said total resulting energy flux transmitted into said cooking zone above said first burner assembly.

18. The grill of claim 13 wherein said inverted V-shaped gap between said two burner assemblies is also configured such that, when (i) only said first burner assembly is operated in said grill, (ii) a convective cooking grate having a total open area of 20% is positioned over said first burner assembly, (iii) said first burner assembly is operated at said highest cooking setting for said first burner assembly which will deliver a high setting rate of said fuel or said fuel and air mixture into said combustion chamber of said first burner assembly, (iv) a convective cooking grate having an open area of 20% is also positioned over said second burner assembly, and (v) none of said fuel or said fuel and air mixture is delivered into said combustion chamber of said second burner assembly, a total resulting energy flux transmitted into said a cooking zone above said second burner assembly will not be greater than 8% of a total resulting energy flux transmitted into said cooking zone above said first burner assembly.

19. The grill of claim 1 wherein all of said left and said right sides and said bottoms of all of said combustion chamber containment walls of all of said adjacent burner assemblies are together formed of a continuous single sheet of material.

20. The grill of claim 1 wherein said burner element is at least ½ inch above said longitudinally extending bottom and said lower ends of said left and said right sides of said combustion chamber containment wall.

21. The grill of claim 2 wherein said burner element is at least ½ inch above said longitudinally extending bottom and said lower ends of said left and said right sides of said combustion chamber containment wall.

22. The grill of claim 3 wherein said burner element is at least ½ inch above said longitudinally extending bottom and said lower ends of said left and said right sides of said combustion chamber containment wall.

23. The grill of claim 22 further comprising a longitudinally extending flame taming shield positioned in said combustion chamber above said burner element and at least 1 inch below said upper discharge opening of said combustion chamber.

24. The grill of claim 5 wherein said burner element is at least ½ inch above said bottom vertex of said combustion chamber containment wall.

25. The grill of claim 24 further comprising a longitudinally extending flame taming shield positioned in said combustion chamber above said burner element and at least 1 inch below said upper discharge opening of said combustion chamber.

* * * * *

UNITED STATES PATENT AND TRADEMARK OFFICE
CERTIFICATE OF CORRECTION

| | | |
|---|---|---|
| PATENT NO. | : 8,985,092 B2 | Page 1 of 1 |
| APPLICATION NO. | : 13/253221 | |
| DATED | : March 24, 2015 | |
| INVENTOR(S) | : Mallik Ahmed | |

It is certified that error appears in the above-identified patent and that said Letters Patent is hereby corrected as shown below:

In the Claims

Claim 4, Column 20, Line 7:    Cancel the word "substantially"
Claim 16, Column 22, Line 19:  Cancel the "a" that comes after "transmitted into said . . ."

Signed and Sealed this
Twenty-first Day of July, 2015

Michelle K. Lee
*Director of the United States Patent and Trademark Office*